(12) United States Patent
Karimi et al.

(10) Patent No.: US 7,567,541 B2
(45) Date of Patent: Jul. 28, 2009

(54) SYSTEM AND METHOD FOR PERSONAL DATA BACKUP FOR MOBILE CUSTOMER PREMISES EQUIPMENT

(76) Inventors: Bizhan Karimi, 9740 Vineyard Ct., Boca Raton, FL (US) 33428; Farrokh Mohammadzadeh Kouchri, 10623 Plainview Cir., Boca Raton, FL (US) 33498

( * ) Notice: Subject to any disclaimer, the term of this patent is extended or adjusted under 35 U.S.C. 154(b) by 736 days.

(21) Appl. No.: 11/254,038

(22) Filed: Oct. 19, 2005

(65) Prior Publication Data

US 2006/0083207 A1    Apr. 20, 2006

Related U.S. Application Data

(60) Provisional application No. 60/620,543, filed on Oct. 20, 2004.

(51) Int. Cl.
*H04W 4/00* (2006.01)
(52) U.S. Cl. ........................ 370/338; 709/203
(58) Field of Classification Search ............ None
See application file for complete search history.

(56) References Cited

U.S. PATENT DOCUMENTS

| 2003/0123422 A1* | 7/2003 | Miya ................... 370/338 |
| 2005/0083877 A1* | 4/2005 | Zilliacus et al. ......... 370/328 |
| 2005/0159141 A1* | 7/2005 | Osborn, Jr. ............ 455/414.2 |
| 2005/0185636 A1* | 8/2005 | Bucher ................. 370/352 |
| 2006/0173975 A1* | 8/2006 | Nose et al. ............ 709/219 |
| 2007/0078964 A1* | 4/2007 | East et al. ............. 709/224 |
| 2007/0118729 A1* | 5/2007 | Adams et al. ........... 713/1 |
| 2008/0184317 A1* | 7/2008 | Khedouri et al. ........ 725/86 |
| 2008/0185433 A1* | 8/2008 | Ando et al. ............ 235/439 |

* cited by examiner

*Primary Examiner*—Ajit Patel
(74) *Attorney, Agent, or Firm*—Howard M. Gitten; Edwards Angell Palmer & Dodge LLP

(57) ABSTRACT

A method for backing up data stored on a mobile customer premises equipment comprising the steps of formatting the data at the mobile customer premises equipment into fields, transmitting the data with a user ID from the mobile customer premises equipment across a mobile network to a server. The server stores the data for retrieval, retrieves the data from the server in response to one of an expiration of time and request from the mobile customer premises equipment; and transmits the data to the mobile customer premises equipment.

23 Claims, 8 Drawing Sheets

SYSTEM AND METHOD FOR PERSONAL DATA BACKUP FOR MOBILE CUSTOMER PREMISES EQUIPMENT

CROSS-REFERENCE TO RELATED APPLICATIONS

This Application is a Non-Provisional application claiming priority (35 USC 119(e)) to Provisional Application No. 60/620,543 filed on Oct. 20, 2004.

BACKGROUND OF THE INVENTION

This invention is directed to a system and methodology of remotely storing personalized information associated with mobile customer premises equipment, and more particularly, the consistent automatic updating and backing up of information associated with respective customer premises equipment (CPE).

As electronic devices such as cell phones, iPods, MP3 players, pagers, personal digital assistants (PDA), even personal computers have become more and more personalized, they are used to store more and more user-specific data. By way of example, cell phones contain address books, stored numbers, calendars and appointments, individualized ring tones, downloaded licensed applications such as location-based services, music, or the like. To some extent, almost all of these individualized features are stored at the cell phone to be operated upon by the telephone or in cooperation with remote servers.

The creation of many of these databases, such as address or calendar, is time intensive requiring manual uploading at the device, such as utilizing the keypad of the telephone in the cell phone example, or the keypad of the PDA in the PDA example to enter each address or calendar event.

It is known in the art for certain devices to download some of the personal information such as stored phone numbers in a cell phone directory or stored calendar information in a PDA. These methods require actual hard wiring in a cradle or other device between the CPE and either a second CPE, such as when transferring stored numbers from cell phone to cell phone, or to some other user-controlled device such as the user's personal computer when synchronizing a PDA with a personal database in the computer. This method has been satisfactory, however, it suffers from the disadvantage that backing up the data or transferring the data only occurs when the user has both the backup device/transfer device and the CPE at the same physical location, and only when the user is able to make the physical connection and spend the time making the transfer.

Furthermore, in the case of a cell phone, because no such cradle is widely available, the data is not backed up, but rather transferred from one cell phone to another at time of purchase by authorized technicians. If the cell phone is either lost or damaged, then the transfer of data cannot occur requiring the user to manually reenter and download all of the personalized information, a time-consuming effort, rife with potential human inputting error. Additionally, many times the settings are forgotten and therefore irrevocably lost. Lastly, transferring from device-to-device may be prevented as a result of the incompatibility of the first device to the second. Not all backup software on a PC is compatible with the synchronization of a PDA, by way of example.

Accordingly, a system and method for overcoming the shortcomings of the prior art are desired.

BRIEF SUMMARY OF THE INVENTION

A system for backing up data for customer premises equipment includes a remote server communicating across a mobile network with a mobile CPE. The remote server receives data from the CPE for remote storage by the server. The data is transferred to the server in response to one of either a request from the server or a non-requested transmission from the CPE. The request from the server may occur at the expiration of predetermined time intervals. The transmission from the CPE, when not in response to a request from the remote server, may occur at the initiation of the user, at the end of an expired time interval, or in response to the update of data downloaded or input at the CPE.

In a preferred embodiment, the remote server contacts the CPE, at least in part, across a mobile network. Furthermore, in a preferred embodiment, the remote server may be disposed within a telephone network switch. The remote server may also be a CPE, such as a cell phone, personal computer, PDA or the like in communication across a mobile network with the CPE.

During use, the data to be stored is structured in a standardized format facilitating storage. If desired, the data may be encrypted. The data is then communicated over a mobile network to the backup server. The server collects the data and stores it. The data may be stored in its entirety each time. In an alternative embodiment, the changes between the previously stored data and the current data may be determined so that only the changes need be stored or overwritten at the server.

These steps are repeated either upon changes of the data as determined by the CPE itself, or on a periodic basis such as weekly, monthly, daily or even hourly if a calendar is to be backed up. Data may be retrieved at any time by the CPE upon user request. Additionally, formatting allows simple transfer of the data from an old device to a new device even if the devices are not of like kind, such as a cell phone to a PDA or laptop. When the data is retrieved, the data is restored to the requesting CPE.

BRIEF DESCRIPTION OF THE DRAWINGS

For a fuller understanding of the invention, reference is had to the following description taken in connection with the accompanying drawings in which.

DETAILED DESCRIPTION OF THE INVENTION

Figure 1:
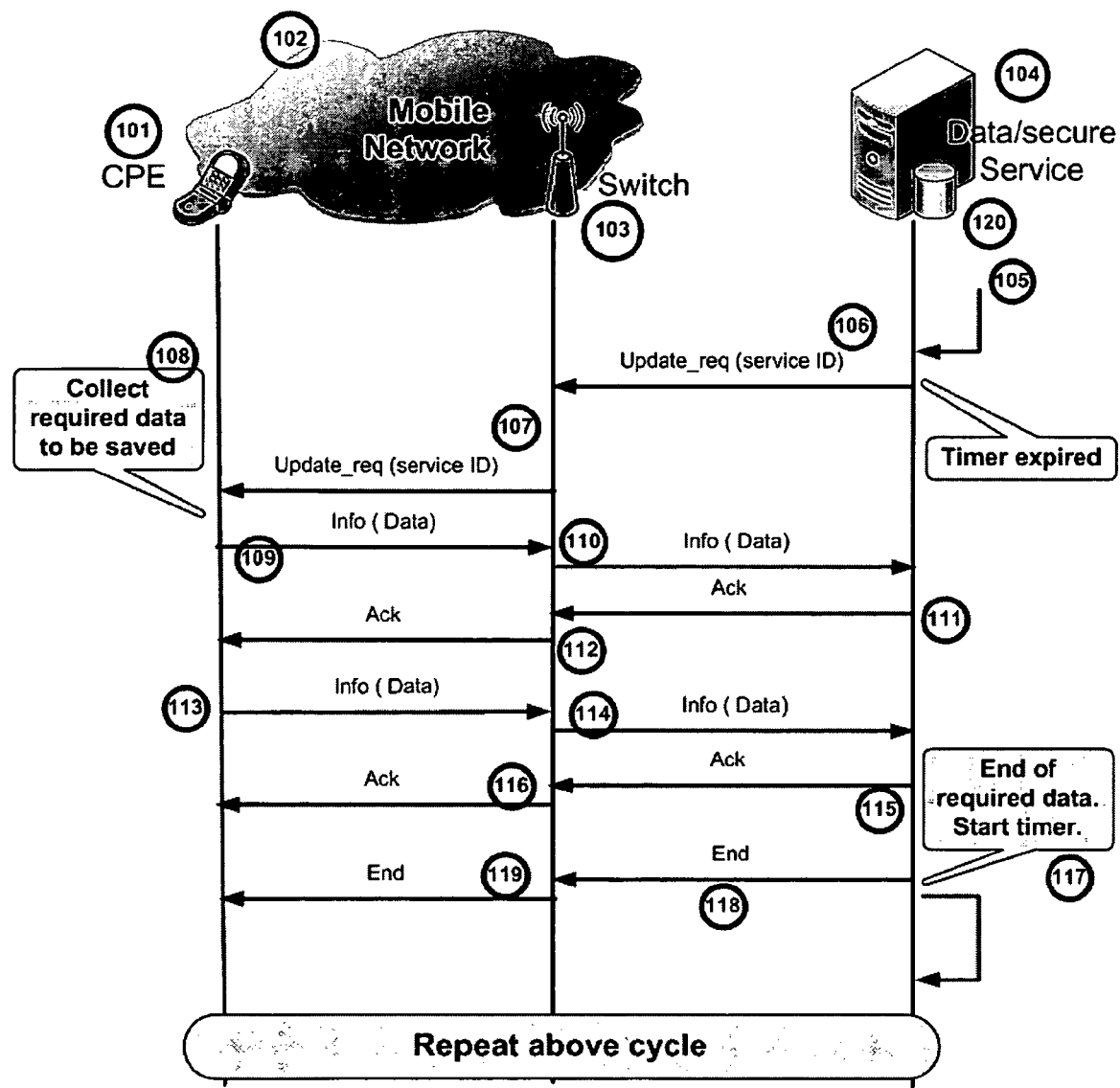
FIG. 1 is an operational flow diagram of automatic data backup in accordance with the invention.

Reference is made to FIG. 1 for which an exemplary embodiment of the invention for backing up data is provided. The invention is used to remotely backup data on customer premises equipment not previously suited for the backing up of such data, most notably mobile devices such as cell phones, personal digital assistants (PDAs), iPods™ and MP3™ digital recorders (collectively known as CPEs). For ease of description, the example of the cell phone will be provided.

A CPE 101 such as a cell phone is part of a mobile communications network 102. As is known in the art, mobile network 102 has an access point at a switch 103. A secure server 104 includes a database 120. In accordance with the invention, in a preferred but non-limiting embodiment, the data to be backed up consists of personal data, such as telephone numbers, addresses, a calendar or schedule, a diary of personalized information such as passwords, account numbers for such as frequent flyer accounts, personalized ring tones, displays, photos, music, or personal applications and games and licenses purchased or otherwise acquired or the like; namely; any data input or downloaded by the user. This data is structured so that data that is subject to change or requires backup is stored in a recognizable format.

In a preferred embodiment, the format may be a file format or a field format, which allows the ability to exclude or include specific fields (settings or records) of the CPE settings. The format may identify each element type by using unique tags for the different record types, such as address as compared to ring tone. Given the overlap, such as ring mode as opposed to ring volume, address book entries and alarm reminders, there may be crossover of elements between the different fields or files. Furthermore, in a preferred embodiment, the data includes an identifier such as a user ID to identify the device for which data is being backed up. As is known in the art, telephone numbers or internet addresses travel with the communications from the device so that given the user ID and the device's own number or address, CPEs can be verified and addressed no matter where they are in a network. Therefore, it follows that a device ID, such as a device serial number or phone number, may also be used as a device identifier. However, this would be disadvantageous in the scenario where data is to be transferred from one device to another such as a replacement phone.

As known in the art, the structure of the data may identify each element type by using unique tags for the different record types. Furthermore, the structure may be defined by the manufacturer as a default and if so, include a manufacturer identifier or structure identifier so as to be recognized by server 104 to allow server 104 to manipulate and store the data at database 120. By utilizing a unified tag and data structure, the methodology and system enables different types of CPE to interpret the data structure accordingly. In a preferred embodiment, although non-limiting, the data is tagged as encrypted data by the CPE.

Depending on the type of device, communication methods, as known in the art, may be utilized to transmit the data between CPE 101 and server 104. For example, short message service ("SMS") may be used or inband communication such as the use of tones, frequency shift keyed signaling or dual-toned multiple frequencies (DTMF) for internet protocol communication or if purely by data communication, e-mail, internet protocol connection, integrated services digital network (ISDN) or file transfer protocol (ftp) if the communication is from CPE to CPE. As is known in the art, these techniques may be used to send any type of data request or data signal.

In the embodiment of FIG. 1, it is determined that data is already stored at CPE 101. Either CPE 101 or the server, as will be discussed in more detail below, will request the backup. In this example, in response to an elapsed time as determined by server 104, an elapsed time signal is generated in step 105. Server 104 outputs an update request signal in step 106 to CPE 101, indicating the server ID and service indications through switch 103. This signal may also indicate the type of data requested, including a full backup of all data, or only the backup of changed data as determined by CPE. The request may also include a request for encryption method and key, the time and date of the CPE transmission.

Switch 103 forwards the signal in a step 107 to CPE 101. The CPE 101 receiving the update request may validate the service center ID and, in response to the signal, structure the data for transmission. Sensitive data, such as passwords, account numbers, even phonebook information, may be subject to CPE-specific encryption. The user, during creation of the data, would have previously identified such data type and provided a key for encryption. Such encrypted data, in a preferred embodiment, is not decryptable by the server, but is stored at the server in its encrypted form. All encrypting and decrypting of the raw data occurs at CPE 101. The data is structured by tagging required data in accordance with the data type. XML, html or other methods as discussed above may be used to create the structured data. Additionally, and in particular, in connection with IP protocol transfer, the data may be portioned into packets for transmission, each packet being subject to additional transport security encryption dependent upon the sensitivity of the data and is subject to decryption by CPE 101 and server 104, preferably with a standard encryption method (e.g., used in internet data transporting).

The packets, whether encrypted or not, are transported in one or more Info signals in a step 109 across mobile network 102 to switch 103. The Info signal may carry additional indications such as acknowledgement of the previously received signal, the date and time stamp or other information as discussed. In a further preferred embodiment, each signal or each packet is provided with a sequential number as well as an acknowledgement of the received update request signal. In turn, switch 103 transmits the Info signal to the server 104 in a step 110. In steps 111 and 112, an acknowledged signal Ack of successful receipt of the information signal may be sent from server 104 through switch 103 across mobile network 102 to CPE 101.

In case optional Ack is expected, upon receipt of the acknowledgement signal Ack, if more data is to be downloaded, a next Info signal is sent in accordance with steps 113, 114 from CPE 101 across mobile network 102 through switch 103 to server 104. The optional acknowledgement process is repeated in steps 115 and 116. The entire process may be repeated until the last information signal is sent by CPE 101 in which a last Info data component is provided in the structure or an END signal is transmitted to indicate to server 104 that the entire information should have been received. Once server 104 determines transmission is completed, by a successful optional END signal being acknowledged in steps 118, 119, or some other means, server 104 starts the timer for the predetermined time interval in a step 117 and the cycle is repeated.

By sequentially numbering each packet or discrete Info signal, it is possible for server 104 to determine that it has received a complete download of information. Additionally, a checksum may be included with the data, which may be used to determine completeness and correctness of transferred data. If it is determined that the numbers are either non-sequential or that one of the numbers in the sequence is missing, server 104 may communicate to CPE 101 that an error in backing up the data has occurred and the process may be repeated, either from the beginning or for that data-specific information signal as the CPE may be able to identify by keeping a log of outgoing signals by way of example. Alternatively, a new download sequence may be initiated at a later time by server 104.

As discussed above, server 104 stores the data in an organized manipulatable form. Since the update may occur on a periodic basis, multiple data for each transmitting entity (CPE 101) will be collected. This data is subject to storage and overwrite of the prior existing data, or may be stored in addition to the preexisting data organized by date and time of backup. In this way, there is an archived history of the data and subsequent changes. On the other hand, only successive changes in the data may be stored so that server 104 may effect the changes in the data by merely overwriting a changed portion between any two subsequent downloads as a representation of the data storage of the various changes. Or the delta has been saved in addition to the previous existing backups in server 104 and data bank 120. This also results in a history of the data at any given point in time.

It should be noted, that by way of example, server 104 is shown at a switch 103 of mobile network 102. However, server 104 could easily be another CPE, either inside or outside of network 102, or a server located within network 102 communicating with the target CPE across a mobile network. It could also be provided within the telephone network or as a separate service provider, much like a call center or an ASP server, which communicates with a multitude of devices through either the standard telephone network, directly through a mobile network, or any other gateway to communication with a CPE.

Figure 2:
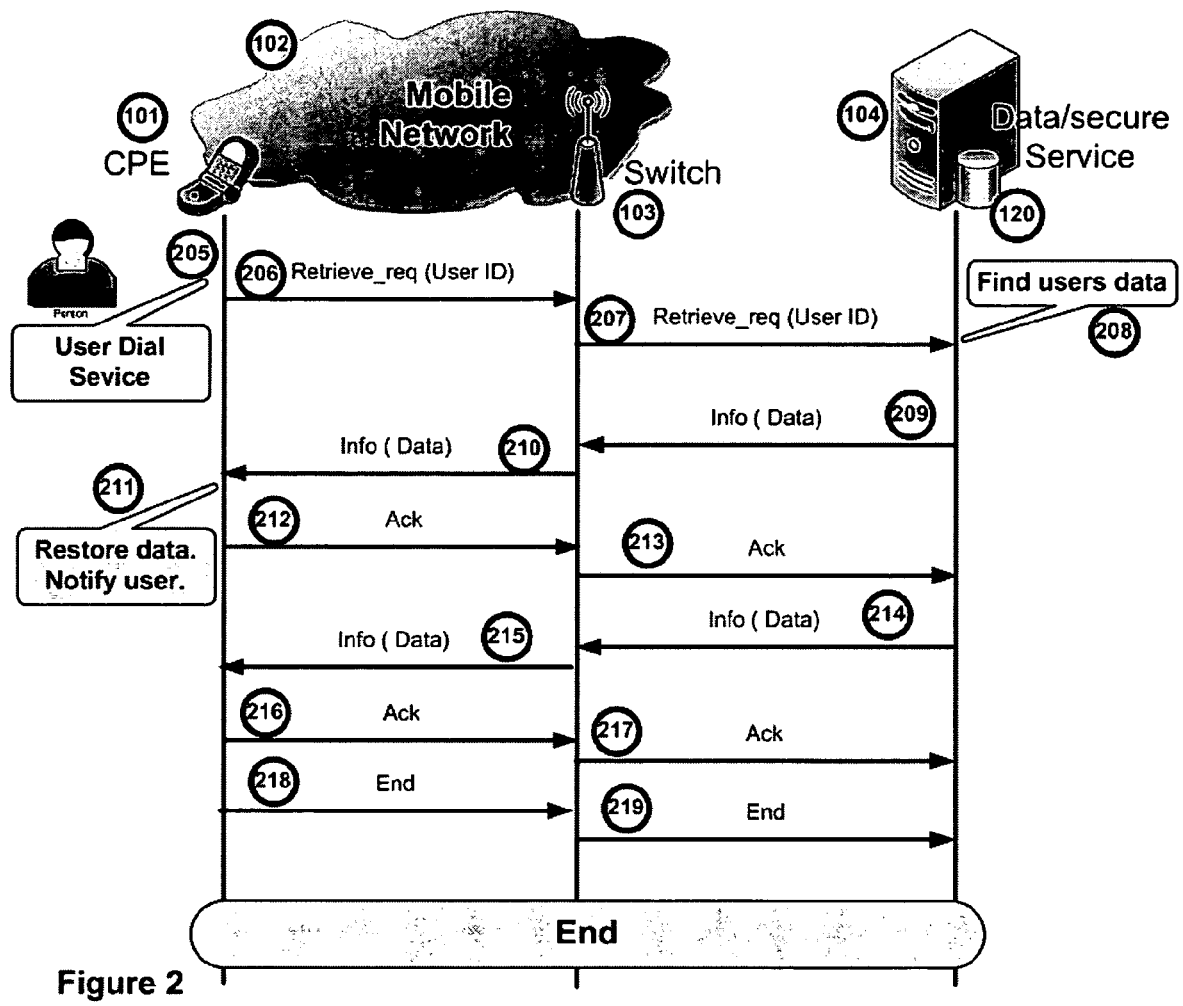
FIG. 2 is an operational flow diagram of data retrieval in accordance with the invention.

Reference is now made to FIG. 2 in which a request for data retrieval in accordance with the invention is shown. Like elements are indicated by like numbers.

Here, a user initiates the retrieval of the stored data from server 104 by dialing in accordance with a step 205. Or any of the means of signaling indicated above. CPE 101 transmits a retrieve request signal in a step 206 to switch 103. The retrieve request signal will include the CPE address such as a phone number, the user ID, and if password protected, the user password. Furthermore, as discussed above, server 104 may store several different versions of the data as either the last recorded change, the sequential changes over time, or the entire information. A retrieve request, Retrieve_req, may also indicate the type of service requested such as a full restoration, partial restoration, restoration to a predetermined time period, and other relevant information such as the encryption method and key, time and date. Switch 103 transmits the retrieve request signal to server 104 in a step 207. In a step 208, server 104 validates the request by determining whether the user ID and one of the CPE or password corresponding to data stored in data server or database 120 to indicate a valid user. Once validated, server 104 will process the data as requested. However, it should be noted, that the functionality of requesting the data may be distributed so that server 104 offers a list of available stored data indices to CPE 101 and the user selects one of the types of stored data. Assuming selection occurs automatically in response to instructions within the retrieve request signal, in a step 109, server 104 transmits the download response to the CPE, utilizing the Info signal containing data to switch 103 which, in turn, transmits, across mobile network 102, the Info signal to CPE 101 in a step 210.

In order to prepare the Info signal, server 104 performs the mirror preparation to that discussed above. Formatting is performed by CPE in transmitting the data in the first place. Server 104 prepares the data as a function of the retrieve request signal. The data is prepared by tagging the required data in accordance with the data type. XML or html or other methods may be used to create the structured data. Again, prepared data may be portioned into smaller packets of information data signals. If not already encrypted, the signal or the packets may be subject to transport security encryption. The encrypted packets can be transported in one or more information signals. The information signals may carry additional indications such as acknowledgement of previously received signals, sequence numbers or the like to allow CPE 101 to confirm the proper and complete reception of data, much as described above with information signals traveling in the other direction.

In a step 210, switch 103 transmits the information signal to CPE 101 across mobile network 102. In a step 111, CPE 101 starts restoring the received data and notifies the user of the received data. An acknowledgement signal Ack may optionally be sent by CPE 101 through switch 103 to server 104 in steps 212 and 213. If more data is to be sent, then successive information signals are forwarded in steps 214 and 215 through switch 103. Data is restored at CPE 101 and an optional acknowledgement signal Ack may be sent in steps 216, 217.

The last Info signal to be sent may include an end of data signal END to be received by CPE 101. When this occurs, either as acknowledgement or in addition to acknowledgment, CPE 101 may confirm the end of receipt of data by transmitting an optional END signal to switch 103 in a step 218, which in turn transmits the END signal to server 104 in a step 219. At this time, server 104 stops sending data. Again, because each Info signal is sequentially identified, CPE 101 may determine whether the complete expected download has been retrieved. CPE 101 will apply the decryption method to recover the received data if applicable at any point in the cycle, if the received data indicates an error such as failure to receive, incorrect sequentially identified signal, or the like, an optional error signal rather than an acknowledgment signal Ack may be transmitted to server 104. This may cause the repetition of the last transmitted data or of all of the data. Errors may be logged for an alarm system.

In a preferred embodiment, the received data may be presented to the user for interactive selection at the CPE for overwrite, save, delete, skip or the like. Or, as a default, CPE 101 may automatically restore the data received and notify the user. Additionally, a checksum may be applied to transmitting data, which can be used to identify completeness and correctness of transferred data.

In this embodiment, the user dial-in in step 105 may be triggered by a user, the elapse of time as measured at CPE 101, or the modification of stored data.

Figure 3:
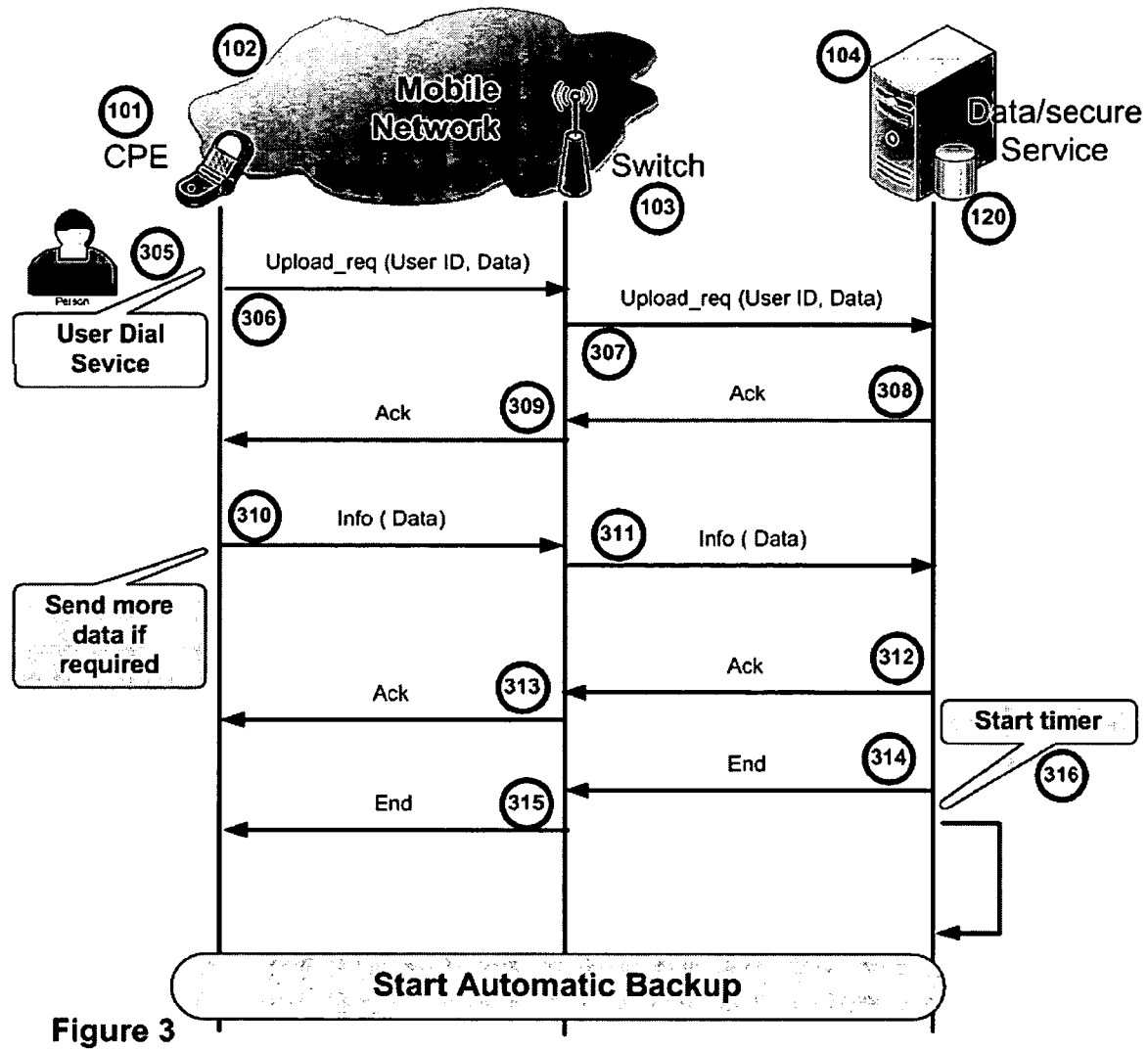
FIG. 3 is an operational flow diagram for user initiated data backup in accordance with the invention.
Figure 4:
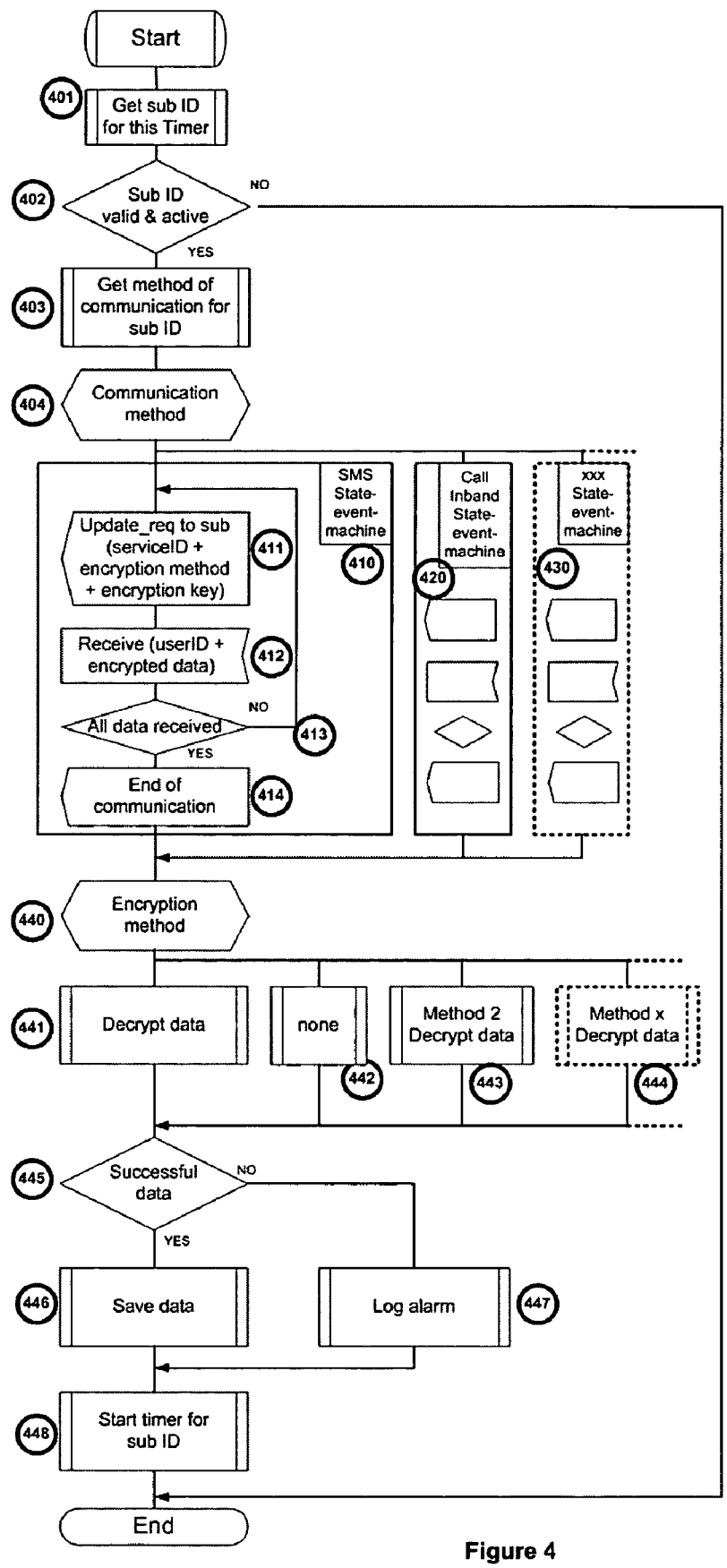
FIG. 4 is a flow chart for requesting data backup in response to a timer expiry in accordance with the invention.

Reference is now made to FIG. 3 in which the process for uploading data at the request of the user, rather than the server (FIG. 1) is provided. Like numerals are used to identify like structures and steps.

A user, in a step 305, initiates the upload request from CPE 101 by sending an Upload_req signal including the user ID and the data to be uploaded in steps 306 and 307 in which the signal is sent across mobile network 102 through switch 103, acting as an access point to the mobile network, to server 104. The Upload_req signal may include not only the user ID and the data, but password and service indication such as full backup or partial backup and other relevant information such as the time, date, encryption type and key.

In a step 308, server 104 receives the upload request and validates it as a proper request based upon the user ID, the password, and the CPE address, if present, and sends an acknowledgement signal Ack to CPE 101 through switch 103. As discussed above, switch 103, in a step 309, may transmit the acknowledgement signal Ack to the identified CPE 101. The acknowledgement signal Ack will include the address of the CPE 101.

As discussed above, CPE 101 under user control will format the data and structure the data so as to be readily usable by server 104. In response to the acknowledgement signal Ack received in step 309, if applicable, the data is prepared with encryption, element keying, the encryption key, element tagging, or the like. XML, html or other methods may be used to create the data structure. Again, the data may be portioned into smaller packets, which may be subject to transport security encryption themselves. Again, in a step 310, the data in the form of encrypted packets may be transported in one or more Info signals. The Info signals may carry additional indications such as acknowledgment of receipt of the previous signal from server 104, sequential numbering, or an end indicator if it is the last packet in a sequence. This data is transmitted across mobile network 102 through 103 to server 104 in steps 310, 311, much as described in connection with FIG. 1 above.

If all is in order, as determined by recognition and processing of the sequence indicator in each information data signal, an optional acknowledgment signal may be sent back to CPE 101 across mobile network 102 in steps 312, 313. If more data is to be sent, steps 310, 311 may be repeated. If server 104 determines that the last information signal was in fact the end of the information signals, it may acknowledge the end in steps 314 and 315 by transmitting an END signal.

If data recovery or downloading is done in accordance with elapsed timing, a timer at either or both of server 104 and CPE 101, may be restarted in a step 316.

Upon receipt of the entire signal, server 104 determines whether download of the data was successful. If verification indicates an error, server 104 may send an alarm to CPE 101. It is understood that at any point in this cycle a mechanism may request repetition of the entire transport or partial repetition if in fact server 104 determines, during steps 310, 311, that complete data has not been received. Errors may be logged for future retrieval.

Figure 5:
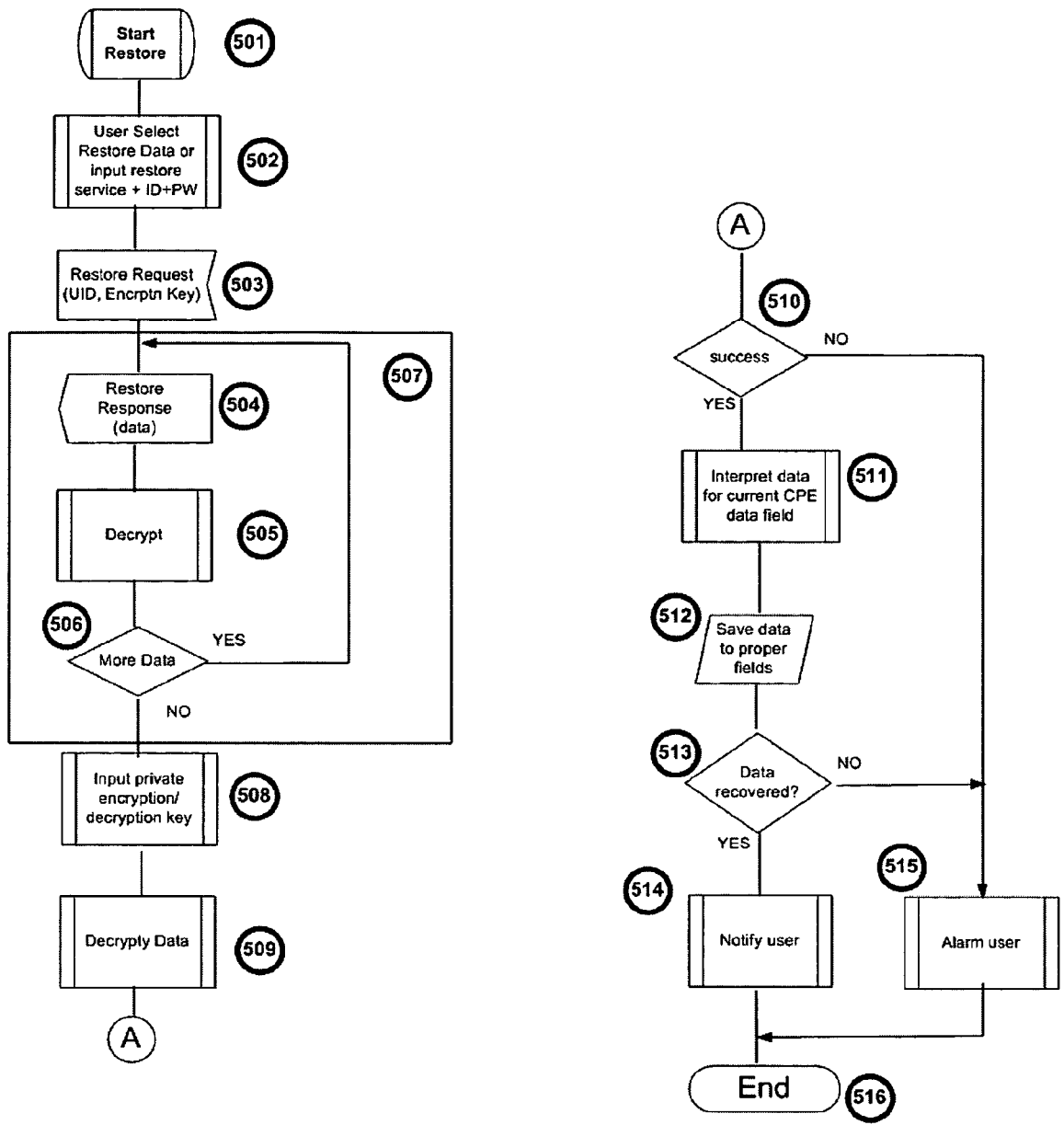
FIG. 5 is a flow chart for restoring data to a device in accordance with the invention.

Reference is now made to FIG. 5 in which the method for backing up data in response to the expiration of a timer is provided in greater detail.

At server 104, timing periods are associated with individual users of the service, hereinafter also known as subscribers, as it is contemplated that the service may be provided on a subscription basis. Server 104 stores time periods associated with a specific subscriber identification. There are two time periods; one being the time period for the subscription itself, and the other being the time period for which data backup should occur. The subscription may be one month, one year or quarterly, while the backup timer may be independent thereof and be on a daily basis, weekly basis or monthly basis as preferred by the user/subscriber. Upon expiration of the backup timer, server 104 retrieves the subscriber ID associated with the timer in a step 401. In a step 402, it is determined whether the subscriber ID is valid and active. This may be determined by either the lack of a subscriber ID associated with the timer as it was deleted for failure to renew a subscription, or a determination that the subscription timer has elapsed. If the subscription ID is no longer valid, the process ends.

As discussed above, the backup information and subscriber ID information is stored at server 104 in database 120 with associated parameters for specific subscribers, such as preferred method of communication (SMS, inband, IP protocol or the like) and type of data, transmission encryption methodology, and type of data saved, whether the delta or changed data is saved, whether an archived history of all changes is saved, or whether a complete data set to be backed up is saved.

If the subscriber ID is valid and active as determined in step 402, server 403 determines the method of communication associated with the subscriber ID and utilizes that communication method in a step 404 by selecting the appropriate communication method. If the communication method is SMS, by way of example, then, in a step 410, downloading begins in a manner similar to that discussed above in connection with FIG. 1. Once the method of communication is determined, then an update request is sent to the subscriber CPE 101 in a step 411. Again, the request includes the service ID, user ID, encryption method and encryption key for the transmission encryption. In a step 412, in response to the update request, CPE 101 sends the user ID plus the encrypted data, plus information such as the sequential numbering in a step 412. In a step 413, it is determined whether or not all data has been received. If not, the process is repeated beginning at step 411. If yes, then the communication ends.

It should be noted that a similar process occurs if the communication method is a call inband state event machine communication method such as in step 420, or some other type of state event machine methodology as in step 430. In other words, this method is communication-method independent.

In a step 440, the encryption method is then identified by server 104 based upon data stored in database 120 or, additional information in the signal received from CPE 101. Once the encryption method is determined in step 440, then a decrypt data step is provided in any one of steps 441, 442, 443 and 444 corresponding to a respective decryption method.

In a step 445, it is determined whether or not data has been successfully received. This may be done with check sums as known in the art, by receiving and determining the correctness of the sequential numbering of transferred data, or other techniques for determining whether data is garbled or noisy. If data has not been successfully received, then in a step 447 an alarm is logged and, as discussed above, may be transmitted to CPE 101 as a negative acknowledgement or a request for retransmission of the same data. If data was successfully transferred as determined in step 445, the data is saved in step 446 by server 104 in database 120. Again, the saving of data may be saving the entire data or just those incremental changes between the previously saved data and the new data. Once data has been successfully saved, the timer for that subscriber ID is restarted in a step 448.

It should be noted that determining the success of the data at steps 440 through 447 can be performed at the end of communication, or within the iterations of steps 410-414.

Reference is now made to FIG. 5 in which a flow chart providing the restoring process in greater particularity is provided. A user selects, at CPE 101, the functionality of restoring data in a step 502. In a step 503, CPE 101 outputs a restore request, the functional equivalent of the retrieve request of FIG. 2, including the user ID, encryption key and CPE identifier.

Similar to the method of FIG. 2, in response to the request, server 104 performs a restore response by transmitting the requested data to CPE 101 in a step 504. In step 505, the data signal is decrypted, if necessary, if the data was encrypted for transport at server 104. In a step 506, it is determined, as is known from steps 216-219, whether more data is to be received. If more data is to be received, step 504 is repeated.

If further data is not to be received, then CPE 101 performs its private decryption for decrypting of the actual data in steps 508, 509. As discussed above, this is the encryption selected by the user of the CPE if at all. Steps 504-509 are optional at the discretion of the user.

It is determined in step 510 whether or not data has been successfully transferred. This may be done as known in the art by way of a check sum, use of the sequential number in each data signal if more than one data signal is utilized, use of the end of data signal END, or other methods as known in the art. If data has not been successfully transferred as determined by CPE 101, then in a step 515 an alarm is issued to the user and the process ends in a step 516. As discussed above, this determination may be done at the end of each transmission of an Info/data signal, i.e., interposed between steps 503 and 506 so that notification of invalid data is provided in the middle of the process, or the process can be performed as demonstrated in FIG. 5 at the end of what is believed to be a completed transmission of data. If the data is determined to have been successfully received, then the data is interpreted in step 511 to be applied to the current CPE data fields. The data is then saved to the proper data fields in a step 512. This may be done making use of the tags, field arrangement and formatting of the data.

In a step 513, it is determined whether the data has been successfully recovered. Again, this may be determined by check sums or the like. If not, then in step 515, the user will be alarmed. If it has been successfully recovered, then in a step 514 the user is notified of a successful restoring of data.

In the most commonly anticipated embodiment, many users of CPEs, such as cellular phones, are not technically "literate." For example upon initialization of a new cellular phone or other mobile device, they may not be capable, or may not be willing to be bothered, to initiate data backup or transfer from their device. In these situations, more conventional methods such as the dialing of a 1-800 call center number or logging on to a website, to request data backup is a more likely occurrence. This request may consist of a password and communication number such as telephone number for a PDA or cellular phone or ISN number for a mobile laptop, iPod, or the like. This request may come directly utilizing the CPE as is known in the art or may come from the user's own conventional computer or conventional telephone or any other third party telephone. In an optional embodiment, this process may be further automated, by automatically incorporating it into the warranty registration or activation processes. Therefore, it could be performed automatically by the sales personnel upon purchase of the device.

Figure 6:
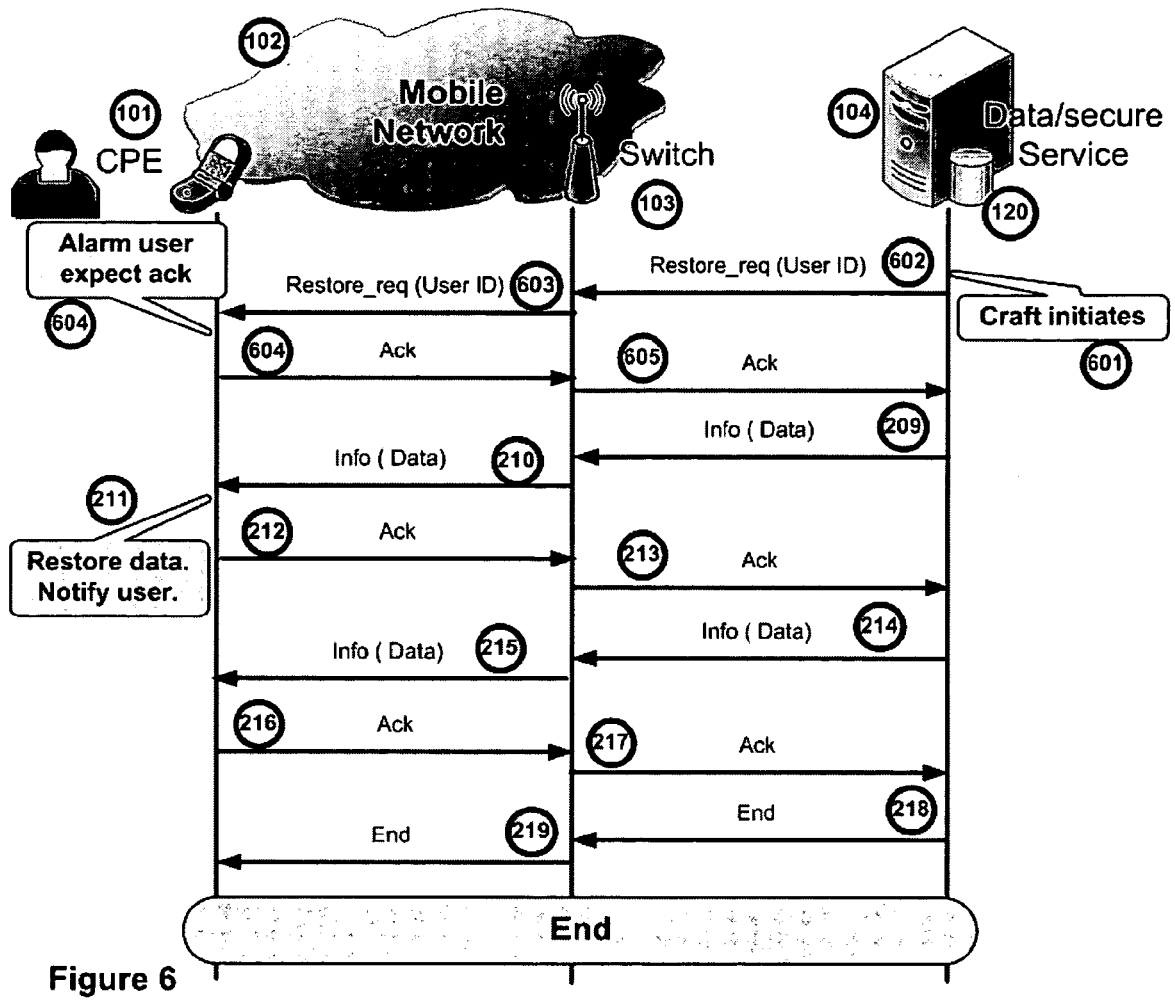
FIG. 6 is an operational flow diagram of data retrieval in accordance with another embodiment of the invention in which a user initiates the backup.

Reference is made in FIG. 6 in which such a preferred embodiment for backing up data is provided. Like numerals are utilized to indicate like methods and structures. In a step 600, a telephone request, here in a non-limiting preferred embodiment, from CPE 101 is made to server 104 in any manner as discussed above. Server 104, for simplification, may also be considered to be positioned at the call center. The user will provide the minimal necessary information, which may include the address of the device to be backed up, and for security, may optionally include a password associated with the user, or a user ID as discussed above. Upon verification of the CPE, in a step 602, a restore request signal Restore_req is transmitted to switch 103 of mobile network 102 and, in turn, in a step 603, the Restore_req signal is transmitted across mobile network 102 to CPE 101 in accordance with a step 603. In a preferred but optional embodiment, CPE 101 transmits acknowledgement signals Ack back to server 104 in steps 604, 605 to acknowledge that CPE 101 and server 104 both anticipate the soon to follow transfer of data as discussed above.

Figure 7:
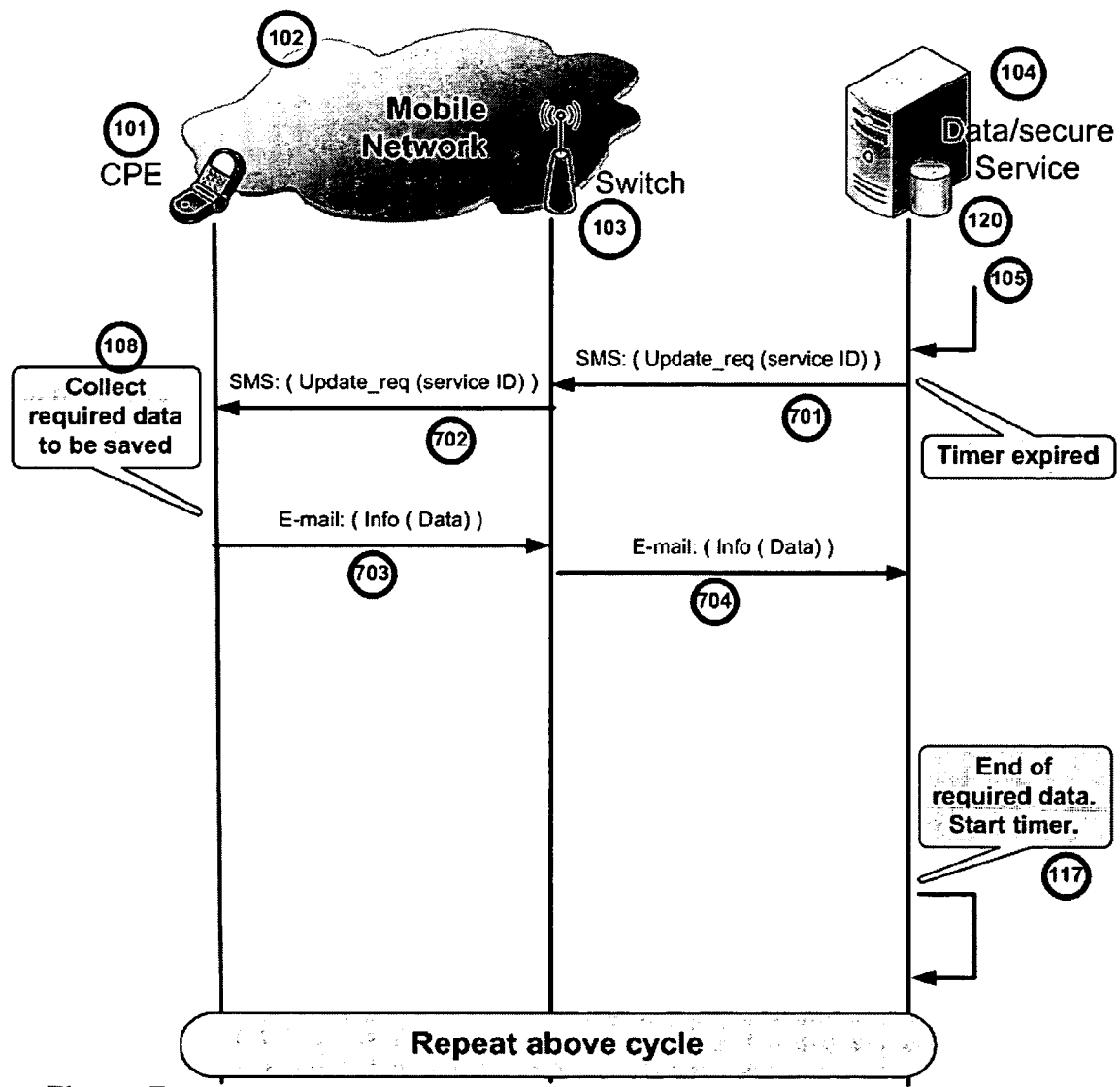
FIG. 7 is an operational flow diagram of automatic data backup in accordance with the invention utilizing SMS communication.

As discussed in detail in connection with FIG. 2, information is provided utilizing Info signals, optionally broken up into packets, in steps 209-214. Again, as discussed above, CPE 101 may initiate an end of data signal Reference is now made to FIG. 7 in which a more detailed flow diagram for the use of SMS and e-mail communication is provided. Because e-mail information is more robust containing more data, the process may be simplified with respect to communication between CPE 101 and server 104. When backing up data, as discussed above, server 104 in response to timer expiration or some other trigger sends an Update_req signal in a step 701. As discussed above, this request signal may include at a minimum the server ID and instructions regarding the type of data requested. In this embodiment, as discussed above, the communication is short message system communication, which is amenable to e-mail. The Update_req is then transmitted through switch 103 across mobile network 102 to CPE 101. In a step 108, as discussed above, the data to be backed up is determined, formatted and arranged by CPE 101. In response to the update request, CPE 101 sends the data signal Info, in response to the request, by e-mail in a step 703 across mobile network 102. Switch 103, acting as the gateway to mobile network 102, transmits the e-mailed information signal Info to server 104 completing the backing up of the data then currently found on CPE 101. The process then ends.

Figure 8:
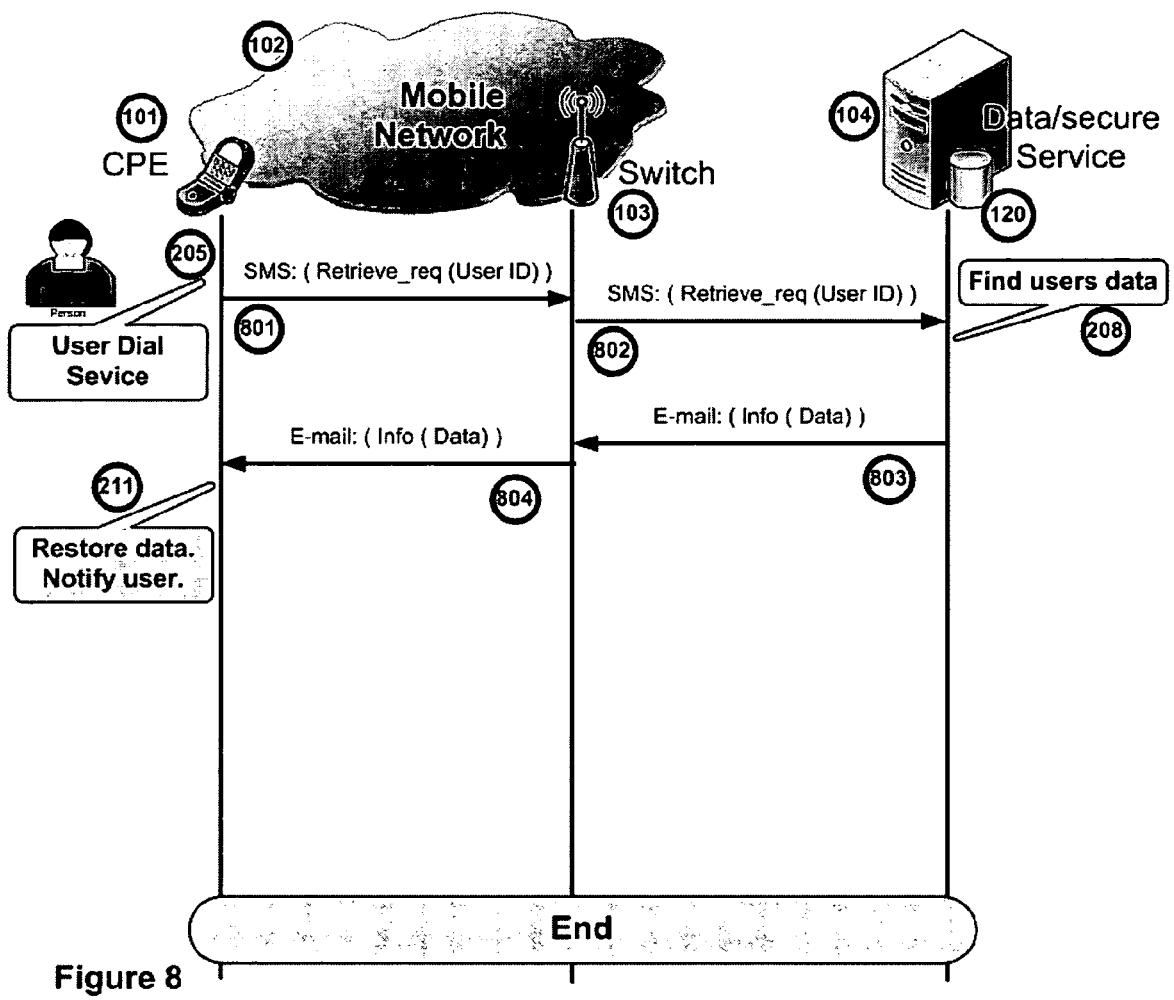
FIG. 8 is an operational flow diagram of data retrieval in accordance with another embodiment of the invention utilizing SMS communication.

It follows that the service may just as easily use an e-mail communication embodiment for retrieving data from server 104. Reference is now made to FIG. 8 showing a methodology for retrieving data from server 104 for updating the data stored at CPE 101. Like numerals are utilized to indicate like structures and methodologies. This methodology is similar to that found in the embodiment of FIG. 2, the primary difference being the specific utilization of SMS and/or e-mail as a communication means.

In response to user request or time expiry, CPE 101 requests a data download from server 104 in a step 205. In a step 801, CPE 101 sends a Retrieve_req signal as an SMS. This Retrieve_req may include the user ID and CPE address. This SMS is transmitted across mobile network 102 and relayed to server 104 by switch 103 in step 802. Upon receipt of the signal, server 104 e-mails an information signal Info containing the requested data to switch 103 in a step 803. Switch 103, in turn, transmits the e-mailed information info across mobile network to CPE 101 in accordance with a step 804. The data is restored and the user is notified of a successful restoration of data in a step 211. The process then ends upon a successful restoration.

By utilizing the above methodology and providing automatic backup of all CPE data at a server remotely located across a mobile network from the CPE, an up-to-date backup of selected mobile CPE settings, such as cell phone settings and data, is always available and ready to be automatically restored for devices not previously available for backup. By utilizing standardized interface and data descriptions, the process of backup and restoration is CPE-type independent. As a result, as compared to existing methods, the new mechanism avoids manual intervention, avoids data conversion errors, and reduces data loss even with mobile devices. Sharing data between two or more devices, whether the second device is a replacement device or an authorized auxiliary user, such as sharing calendar data with a partner or spouse, is eased using this system. Licensed data, such as purchased ring tones, may be transferred from one device to another device while tracking such transfer at the server in order to comply with licensing restrictions. This backup service is flexible enough to be utilized by the network switch, within the CPE itself, or in an external services center, which communicates across a mobile network.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

What is claimed as new and desired to be protected by Letters Patent of the United States is:

1. A method for backing up data stored on a mobile customer premises equipment comprising the steps of:
    storing data at the mobile customer premises equipment;
    formatting the data stored at the mobile customer premises equipment into fields by determining data fields, identifying which portions of said data correspond to a respective data field, and tagging said data,
    transmitting the data with a user ID from the mobile customer premises equipment across a mobile network to a server for storage;
    retrieving said data from said server across a mobile network in response to one of an expiration of time and request from said mobile customer premises equipment by transmitting said data to said mobile customer premises equipment; and transmitting said data to said mobile customer premises equipment by transmitting the data in more than one information signal and sequentially numbering each of said information signals.

2. The method of claim 1, wherein said request is in response to a change of data at said mobile customer premises equipment.

3. The method of claim 1, wherein said expiration of time is determined by said mobile customer premises equipment.

4. The method of claim 1, wherein said expiration of time is determined by said server.

5. The method of claim 1, wherein said retrieving said data across the mobile network from said server includes the step of sending an update request from said server to said mobile customer premises equipment.

6. The method of claim 5, wherein the update request includes a server ID, and said mobile customer premises equipment collects the required data to be stored and sends an update response to said server.

7. The method of claim 5, wherein retrieving said data from said server includes transmitting a retrieve request signal from said mobile customer premises equipment to said server.

8. The method of claim 7, wherein said retrieve request includes a user ID and the server transmits the requested data in response thereto.

9. The method of claim 1, wherein said formatting is standardized.

10. The method of claim 1, wherein transmitting the data from said server includes transmitting only the changes in data which have occurred since a previous transmission.

11. A method for backing up data stored on a mobile customer premises equipment comprising the steps of:
   formatting the data at the mobile customer premises equipment into fields,
   transmitting only the changes in data which have occurred since a previous transmission
   transmitting only the changes in the data with a user ID from the mobile customer premises equipment across a mobile network to a server for storage, by transmitting the data in more than one information signal across the mobile network and sequentially numbering each of said information signals, in response to one of an expiration of time, request from said server, and change in status of data at said mobile customer premises equipment; and
   said server storing said data for retrieval and transmitting said data to the mobile premises equipment.

12. The method of claim 11, wherein said expiration of time is determined by said mobile customer premises equipment.

13. The method of claim 11, wherein said expiration of time is determined by said server.

14. The method of claim 11, further comprising the step of retrieving said data from said server by sending an update request from said server, across the mobile network, to said mobile customer premises equipment.

15. The method of claim 14, wherein the update request includes a server ID, and said mobile customer premises equipment collects the required data to be stored and sends an update response across the mobile network to said server.

16. The method of claim 11, wherein formatting the data includes the steps of determining data fields, identifying which portions of said data correspond to respective data fields and tagging said data.

17. A system for backing up data on a mobile customer premises equipment comprising:
   a mobile customer premises equipment, said mobile customer premises equipment storing data thereon, the data being formatted into fields, and selectively sending a request for the data;
   a server in communication with said mobile customer premises equipment across a mobile network and storing said data, said mobile customer premises equipment transmitting the data with a user ID to said server in more than one information signal and sequentially numbering each of said information signals, said server storing said data for retrieval by determining data fields, identifying which portions of said data correspond to a respective data field, and tagging said data, said data being retrieved from said server in response to one of an expiration of time and requests from said mobile customer premises equipment, said server transmitting said data to said mobile customer premises equipment.

18. The system of claim 17, wherein said mobile customer premises equipment makes said request and responds to a change in said data at said mobile customer premises equipment.

19. The system of claim 17, wherein said mobile customer premises equipment determines the expiration of time.

20. The system of claim 17, wherein said server determines said expiration of time.

21. A system for backing up data on a mobile customer premises equipment comprising:
   a mobile customer premises equipment storing data thereon, the data being formatted into fields, and selectively transmitting said data with a user ID; and
   a server in communication with said mobile customer premises equipment across a mobile network and storing said data for retrieval by said mobile customer premises equipment, said server storing said data in response to transmission of said data from said mobile customer premises equipment, said mobile customer premises equipment transmitting only the changes in data which have occurred since a previous transmission to said server in response to one of an expiration of time and request from said server by transmitting the change in data in more than one information signal across a mobile network, and sequentially numbering each of said information signals.

22. The system of claim 21, wherein said mobile customer premises equipment sends said data in response to a change in said data at said mobile customer premises equipment.

23. The system of claim 21, wherein said server requests said data from said mobile customer premises equipment in response to an expiration of time as determined by said server.

* * * * *